United States Patent [19]

Murphy et al.

[11] Patent Number: 4,761,435
[45] Date of Patent: Aug. 2, 1988

[54] POLYAMINE-POLYENE ULTRAVIOLET COATINGS

[75] Inventors: Edward J. Murphy, Mt. Prospect; Ronald S. Conti, New Lennox, both of Ill.

[73] Assignee: DeSoto, Inc., Des Plains, Ill.

[21] Appl. No.: 914,989

[22] Filed: Oct. 3, 1986

[51] Int. Cl.⁴ .................... C08G 73/02; C08F 265/06
[52] U.S. Cl. ........................................ 522/46; 522/14; 522/95; 522/106; 522/108; 522/117; 522/121; 522/904; 525/112; 525/278; 525/281; 525/293
[58] Field of Search ............... 522/117, 121, 904, 106, 522/46

[56] References Cited

U.S. PATENT DOCUMENTS

| 2,760,863 | 8/1956 | Plambeck | 430/281 |
| 3,835,085 | 9/1974 | Wrzesinski | 522/84 |
| 3,887,450 | 6/1975 | Gilano | 522/117 |
| 4,148,967 | 4/1979 | Satoh | 522/106 |
| 4,501,767 | 2/1985 | Iimure | 522/14 |

FOREIGN PATENT DOCUMENTS 2100278 12/1982 United Kingdom ................ 522/14

Primary Examiner—John C. Bleutge
Assistant Examiner—David Buttner
Attorney, Agent, or Firm—Dressler, Goldsmith, Shore, Sutker & Milnamow, Ltd.

[57] ABSTRACT

Ultraviolet-curable ethylenically unsaturated liquid coating composition are disclosed which consist essentially of:

1—polyethylenically unsaturated material in which the ethylenically unsaturated groups are polymerizable groups which are not (meth)acrylate groups;
2—a polyamine resin, preferably a polytertiary amine resin; and
3—an aryl ketone photosensitizer.

18 Claims, No Drawings

POLYAMINE-POLYENE ULTRAVIOLET COATINGS

DESCRIPTION

1. Technical Field

This invention relates to ultraviolet-curable ethylenically unsaturated liquid coating compositions which cure in the absence of both (meth)acrylate unsaturation and thio-functional compounds.

2. Background Art

Ultraviolet-curable coating compositions are well known and in common use, but these are primarily of several types, each of which is relatively expensive and possesses distinct disadvantages.

On the one hand we have acrylate-functional compositions which cure on exposure to ultraviolet radiation in the presence of an appropriate photoinitiator or photosensitizer. These may include appropriate tertiary amine compounds to minimize oxygen inhibition and thus render the coatings rapidly curable in the presence of air. However, acrylate-functional compounds and oligomers are expensive and introduce a degree of toxicity and hazard.

On the other hand, thiol-containing compositions are available in which a polythiol component coreacts with a polyene, usually a polyallylic compound (upon exposure to ultraviolet light.) Again an appropriate photoinitiator is required. However, the polythiols needed in these compositions are costly and odorous.

Polyepoxide-containing compositions are also curable with ultraviolet light in a cationic cure, but these compositions require expensive and exotic catalysts to initiate this unusual cure.

Additionally, the known ultraviolet-curable coatings tend to shrink excessively on cure, they are frequently brittle and adhere poorly to the substrate, their solvent resistance is only moderate, they are sensitive to post-cure embrittlement, and they lose weight excessively on baking.

This invention provides new ultraviolet-curable liquid coating compositions of a different character which cure on ultraviolet exposure with reasonable rapidity, even in the presence of air, and which are significantly less costly than those now in common use. Moreover, these compositions are less toxic and hazardous than the prior acrylate compositions and they cure to provide films having generally better physical characteristics and which minimize many of the inadequacies discussed above.

It is particularly intended to provide coating compositions which can serve as ultraviolet-curable sealers for sheet molding compositions in which unsaturated polyester-styrene mixtures are filled with reinforcing material, especially glass fibers, and cured with heat in the presence of a catalyst for speeding addition copolymerization. These cured compositions have a porous surface, and these pores must be filled with a composition which cures without damaging the substrate, preferably with ultraviolet light.

On the other hand, the liquid compositions of this invention can be used for diverse coating utility, including the production of fiber composites where the fibers permit ultraviolet light to adequately penetrate the composite.

DISCLOSURE OF INVENTION

In accordance with this invention, an ultraviolet-curable ethylenically unsaturated liquid coating composition consists essentially of: 1—polyethylenically unsaturated material in which the ethylenically unsaturated groups are polymerizable groups which are not (meth)acrylate groups; 2—a polyamine-functional resin; and 3—an aryl ketone photosensitizer, like benzophenone. While it is possible to select components which are adequately liquid in the absence of inert volatile organic solvent, it is usually necessary to include sufficient inert solvent, like methyl ethyl ketone, to provide the liquidity required for coating application. Also, some of the inert solvent can be replaced by non-acrylate-functional monoethylenically unsaturated liquid, like dibutyl maleate.

The polyethylenically unsaturated material may be polymeric, oligomeric or monomeric so long as it includes a plurality of ethylenic groups which are not acrylate or methacrylate groups. It is preferred to use relatively low molecular weight polyester resins, especially those which include maleate or fumarate groups to provide the polymerizable unsaturation. These may be used alone or in combination with other non-acrylate or methacrylate ethylenically unsaturated liquid.

Other types of ethylenic unsaturation may also be used, either alone or in combination with one another. These are illustrated by allyl, vinyl and styryl unsaturation; allyl unsaturation being preferred among these.

Allyl esters which may be used are illustrated by diallyl maleate and diallyl phthalate. Allyl ethers which may be used are illustrated by trimethylolpropane diallyl ether. Allyl carbamates which may be used are illustrated by the reaction product of two moles of allyl alcohol with one mole of toluene diisocyanate. Allyl carbonates are illustrated by bisallyl diglycol carbonate. Heterocyclic allyls which may be used are illustrated by triallyl cyanurate and triallyl isocyanurate. Allyl amine or diallyl amine adducts of polyepoxice compounds, such as the diglycidyl ether of bisphenol A, are also useful.

A suitable vinyl ether is diethyleneglycol divinyl ether.

Polyesters derived from maleic anydride, fumaric acid, cinnamic acid or itaconic acid are suitable. These unsaturated polyesters are illustrated by a polyester of maleic anhydride/phthalic acid/ethylene glycol in molar proportions of 1.6/1.0/2.7.

The various polyunsaturated compounds are useful alone or in combination at levels of 10% to 90%, and preferably at levels of 20% to 60%, based on the total weight of the admixture with the polyamine resin. The preferred proportion will vary depending on the polyamine resin which is employed.

Because of the variation in molecular weight and number of reactive groups which may be encountered, we prefer to specify the ratio of unsaturated functionality to amine functionality, and this, on an equivalent basis, is from 0.5/1 to 15/1, more preferably 3/1 to 6/1.

Any polyamine resin may be used, but it is preferred to employ an amine resin having plurality of teritary amine groups. It is presently preferred to employ an acrylic copolymer containing copolymerized tertiary amine-functional monomer such as dimethylaminoethyl acrylate or the corresponding methacrylate, acrylamide or methacrylamide. The corresponding diethylamino compounds as well as the corresponding monomers in which the aminoethyl group is replaced by aminopropyl or aminobutyl, are also useful. These copolymers will contain from 5% to 50% of the amine monomer component, preferably 10% to 20%.

These acrylic copolymers are preferably prepared by polymerization in volatile organic solvent solution to provide the copolymers in organic solvent solution, preferably at 50% to 70% solids content. These solutions are then combined with the remaining components of the composition to provide the admixtures with the polyethylenic component which has been specified previously.

The polyamine resin may be constituted by other resins, such as an adduct of a resinous polyepoxide, illustrated by a diglycidyl ether of bisphenol A having a number average molecular weight of about 390 or 1,000, with a reactive amine. Epoxy novolac resins are also useful. When a monosecondary amine, such as diethyl amine or dibutyl amine, is used, the product contains tertiary amine groups. If excess primary amine, like n-butyl amine, is used, then the polyamine resin will contain secondary amine groups which can be used in a post-cure. The molecular weight of the polyepoxide can range from 350 to 5000. Michael adducts of amines containing amino hydrogen atoms with resinous polyacrylates are also suitable, but are expensive and not preferred. These are illustrated by pentaerythritol triacrylate reacted with a stoichiometric proportion of toluene diisocyanate and a stoichiometric proportion of diethyl amine.

Polyamine resins containing primary amine groups are illustrated by polyoxypropylene derivatives of polyhydric alcohols, such as ethylene glycol, propylene glycol or trimethylol propane, which are terminated with primary amine groups, these being available in commerce from Texaco in Houston, Tex.

As will be evident, the amino hydrogen atom can react with acrylate unsaturation, but it is not reactive with the non acrylate unsaturation used herein, so there is no difficulty connected with the use of polyamine resins in which the amine groups contain reactive amino hydrogen atoms.

The photosensitizer employed in these coatings can be any soluble compound that under goes reduction in the presence of amines upon ultraviolet radiation between 200 and 400 mm wavelength, by abstraction of an aminocarbon hydrogen atom resulting in aminocarbon radical formation. The most commonly used and preferred sensitizer is benzophenone. Other typical sensitizers which may be used alone or in combination are xanthone, thioxanthone and derivatives, fluorenone, anthraquinone. These compounds or their derivatives may be used unmodified or they may be used as oligomeric derivatives as in the adduct of Epon 828 (Shell Chemical Company) with benzoylbenzoic acid. The effective level of photosensitizer ranges from 1% to 20% of the weight of the reactive components depending on the arylcarbonyl equivalent weight. More preferably, as with benzophenone, the effective level is 4% to 10%.

These present ultraviolet curable coatings are typically applied from solvent solution of 50% to 80% solids by weight by spray atomization or other methods. After solvent flashoff, they are cured by exposure to ultraviolet radiation generally ranging from 1.0 to 5.0 joules/cm. sq.

No post cure thermal treatments are required, but they may be used. Thus, the amine-functional resin may include N-methylol groups from the inclusion of N-methylol acrylamide or N-methylol methacrylamide or a lower alkyl ether thereof, such as butoxymethyl acrylamide, and these will continue to cure after the ultraviolet cure has been completed (more rapidly at elevated temperature). Similarly, hydroxy functionality may be included in the amine-functional resin from the inclusion of an hydroxyalkyl acrylate or methacrylate, especially 2-hydroxyethyl acrylate or methacrylate, in the monomers which are copolymerized,, and an aminoplast resin may be included to allow for a post cure, especially upon exposure to elevated temperatures after the ultraviolet cure has been completed. Also, when the amine groups in the polyamine resin contain amino hydrogen atoms, these can be post-cured using blocked polyisocyanates or phenolic resins.

It is desired to point out that in the usual situation the polyamine resin and the polyethylenically unsaturated material are separately provided, but this is not an essential aspect of this invention. Indeed, for some purposes it is preferred to have both of these components present in a single resin component. This minimizes compatibility difficulties and it simplifies cathodic electrocoating with the ultraviolet-curable compositions under consideration.

The formation of single resin components containing a plurality of amine groups and also a plurality of ethylenically unsaturated groups can be easily achieved in several ways, and these are illustrated by the inclusion of hydroxy functionality in the polyamine resin. The manner of including hydroxy functionality in copolymers of monoethylenic tertiary amine monomers has already been explained. These will desirably include from 3% to 30%, preferably from 5% to 15% of the hydroxy monomers which are illustrated by hydroxyethyl acrylate or methacrylate or the corresponding hydroxypropyl or hydroxybutyl compounds in the monomer mixture which is copolymerized. However, polyepoxide-secondary amine adducts are useful polytertiary amine resins for use herein, such as diglycidyl ethers of a bisphenol having a number average molecular weight of from 350 to 5000, and these already contain hydroxy groups. These hydroxy-functional polytertiary amine resins can be modified in various ways to include a plurality of ethylenically unsaturated groups therein.

One simple way to inlcude appropriate ethylenic groups is to react the hydroxy groups in the above-described amine resins with an unsaturated monoisocyanate. These are illustrated by the urethane reaction product of one mole of allyl alcohol with one mole of an organic diisocyanate having one isocyanate group which is more reactive than the other, such as toluene diisocyanate or isophorone diisocyanate. One can also use a styryl-unsaturated monoisocyanate, such as alpha, alpha-dimethyl-m-isopropenyl benzyl isocyanate.

The hydroxy groups in the above-described amine resins can also be esterified with a monoethylenically unsaturated carboxylic acid, like monobutyl maleate.

As a matter of interest, the urethanization and esterification reactions employed above are assisted by the presence of amine groups which serve as catalysts for both of these reactions, minimizing the temperature needed. Also, the allyl, styryl or maleate unsaturations are more resistant to premature polymerization, and well resist polymerization at the temperature used to couple the ethylenic unsaturation to the amine resin.

It should be noted that solvent-soluble cellulosic resins are also useful herein, such as nitrocellulose and cellulose esters, such as cellulose acetate. These contain hydroxy groups which will react with isocyanate or carboxyl groups in monoethylenic compounds, as above discussed, and the urethanization reaction or the esterification reaction which have been discussed are best carried out in the presence of the added amine resin which catalyzes the reaction which adds unsaturation to the cellulosic resin. Moreover, the heat used for the reaction also helps to compatibilize the cellulosic resin with the amine resin.

Another type of polytertiary amine resin which can include the required ethylenic unsaturation in the form of maleate or fumarate unsaturation is a polyester resin made with a polyhydric alcohol containing amine groups, such as triethanolamine. Thus, two moles of maleic anhydride can be reacted with one mol of triethanolamine to form a carboxyl-functional trimaleate which is then reacted with 1.5 moles of butylene glycol while removing water of esterification to form an hydroxy-functional maleate-unsaturated polyester containing a plurality of teritary amine groups.

It shoud be kept in mind that unreacted carboxyl groups may form amine salts with the tertiary amine groups in the compositions of this invention. Accordingly, carboxyl-functional materials are preferably absent or minimized herein so that enough tertiary amine groups will remain as free amine groups in the composition which is irradiated. This is particularly important when polyesters are used, suggesting that these should be reacted until the carboxyl functionality is substantially consumed. As a result, the polyesters used herein will preferably have an hydroxy value of at least 50, preferably at least 100, and an acid value of less than 10, preferably less than 5.

Similarly, acrylate and methacrylate unsaturation is preferably absent from the compositions of this invention, albeit a small amount thereof might be tolerated, especially if this undesired group is part of a high molecular weight nonvolatile resin.

The invention is illustrated in the accompanying examples in which all parts are by weight, unless otherwise specified.

EXAMPLES

| CODE | COMPOSITION | SUPPLIER |
|---|---|---|
| T-403 | Polyoxypropylene triamine | Jefferson Chemical |
| DAM | Diallyl maleate | FMC Corporation |
| DAP | Diallyl phthalate | FMC Corporation |
| DAA | Diallyl adipate | Hardwicke Chemical |
| TMPDAE | Trimethylol propane diallyl ether | National Starch |
| CR39 | Bisallyl diglycol carbonate | PPG Industries |
| TAC | Triallyl cyanurate | American Cyanamid |
| DEGDVE | Diethylene glycol divinyl ether | GAF Corporation |
| BP | Benzophenone | Aldrich Chemical |
| BuAc | Butyl acetate | Commercial Solvents |
| MEK | Methyl ethyl ketone | Commercial Solvents |
| Acrylic #1 | Solution polymerized acrylic resin of 2-ethyl hexyl acrylate/methyl methacrylate/dimethyl aminoethylacrylate at ratios 60/30/10 supplied at 55% solids in butyl acetate. | |
| Acrylic #2 | Solution polymerized acrylic resin of butyl acrylate/dimethyl aminoethyl acrylate at ratios 80/20 supplied at 66% solids in butyl acetate. | |

-continued

| | |
|---|---|
| Epoxy Adduct #3 | The reaction product of Epon 1001 from Shell Chemical and diethylamine. Supplied at 60% solids in toluene. Amine equivalent weight of 556. |
| Polyester #4 | Solution polymerized polyester of maleic anhydride/phthalic anhydride/ethylene glycol in molar rations of 1.6/1.0/2.7 supplied at 73% solids in xylene. Acid valud less than 10. |
| Allyl Urethane #5 | The solution product of the addition of three moles of allyl alcohol to one mole of Desmodur N polyisocyanate from Mobay Chemical. Supplied at 75% solids in methyl ethyl ketone. |

| Example | 1 | 2 | 3 | 4 | 5 | 6 |
|---|---|---|---|---|---|---|
| Acrylic Resin #1 | 143 | 125 | | | | |
| Acrylic Resin #2 | | | 111 | 120 | 95 | 67 |
| TAC | 20 | | 27 | | | |
| DAM | | 30 | | 21 | | |
| DAA | | | | | 37 | |
| Allyl Urethane #5 | | | | | | 75 |
| BP | 5 | 5 | 8 | 8 | 8 | 8 |
| MEK | 32 | 90 | 54 | 51 | 60 | 50 |
| | 200 | 250 | 200 | 200 | 200 | 200 |
| Cure Dosage: | | | | | | |
| j/cm.sq. | 3.5 | 3.5 | 3.5 | 3.5 | 3.5 | 3.5 |
| MEK rub resistance | 140 | 140 | 90 | 120 | 20 | 50 |
| Adhesion to fiberglass reinforced plastic (FRP) | Pass | Pass | Pass | Pass | Pass | Pass |

| Example | 7 | 8 | 9 | 10 | 11 | 12 |
|---|---|---|---|---|---|---|
| Acrylic Resin #2 | 91 | 111 | 98 | 100 | 61 | |
| Epoxy Adduct #3 | | | | | | 53 |
| DAP | 40 | | | | | |
| CR39 | | 27 | | | | |
| TMPDAE | | | 35 | | | |
| DEGDVE | | | | 34 | | |
| Polyester #4 | | | | | 82 | 93 |
| BP | 8 | 8 | 8 | 8 | 8 | 8 |
| MEK | 61 | 54 | 59 | 58 | 49 | 46 |
| | 200 | 200 | 200 | 200 | 200 | 200 |
| Cure Dosage: | | | | | | |
| j/cm.sq. | 3.5 | 3.5 | 3.5 | 3.5 | 3.5 | 3.5 |
| MEK rub resistance | 80 | 100 | 15 | 15 | 90 | 130 |
| Adhesion to FRP | Pass | Pass | Pass | Pass | Pass | Pass |

What is claimed is:

1. An ultraviolet-curable ethylenically unsaturated liquid coating composition consisting essentially of:
   (1)—polyethylenically unsaturated material in which the ethylenically unsaturated groups are polymerizable groups which are not (meth)acrylate groups;
   (2)—a polyamine resin; and
   (3)—an aryl ketone photosensitizer.

2. An ultraviolet-curable coating composition as recited in claim 1 in which said components (1), (2) and (3) are in solution in a volatile inert organic solvent to provide coating viscosity.

3. An ultraviolet-curable coating composition as recited in claim 1 in which said polyamine resin is a polytertiary amine resin.

4. An ultraviolet-curable coating composition as recited in claim 1 in which said composition further includes a monoethylenically unsaturated liquid in which the ethylenically unsaturated groups are polymerizable groups which are not (meth)acrylate groups.

5. An ultraviolet-curable coating composition as recited in claim 1 in which said ethylenically unsaturated groups are selected from the group consisting of allyl, vinyl, styryl, maleate, fumarate, and mixtures thereof.

6. An ultraviolet-curable coating composition as recited in claim 1 in which said polyethylenically unsaturated material comprises a maleate or fumarate-containing polyester resin.

7. An ultraviolet-curable coating composition as recited in claim 3 in which said polytertiary amine-functional resin is a solvent-soluble copolymer containing from 5% to 50% by weight of a tertiary-amine-functional monoethylenic monomer.

8. An ultraviolet-curable coating composition as recited in claim 7 in which said amine-functional monoethylenic monomer is a dimethyl or diethylamino ethyl, propyl or butyl acrylate, methacrylate, acrylamide or methacrylamide.

9. An ultraviolet-curable coating composition as recited in claim 8 in which said amine-functional monoethylenic monomer is present in said copolymer in an amount of from 10% to 20% by weight.

10. An ultraviolet-curable coating composition as recited in claim 1 in which said components 1 and 2 are present in a ratio of unsaturated functionality to amine functionality, on an equivalent basis, of from 0.5/1 to 15/1.

11. An ultraviolet-curable coating composition as recited in claim 3 in which said components 1 and 2 are present in a ratio of unsaturated functionality to amine functionality, on an equivalent basis, of from 3/1 to 6/1.

12. An ultraviolet-curable coating composition as recited in claim 1 in which said photosensitizer is present in an amount of from 1% to 20%.

13. An ultraviolet-curable coating composition as recited in claim 12 in which said photosensitizer is benzophenone.

14. An ultraviolet-curable coating composition as recited in claim 1 in which said components 1 and 2 are supplied by a single resin.

15. An ultraviolet-curable coating composition as recited in claim 14 in which said single resin is an hydroxy-functional polytertiary amine resin which has been reacted via its hydroxy functionality with an ethylenically unsaturated monoisocyanate or an ethylenically unsaturated monocarboxylic acid.

16. An ultraviolet-curable coating composition as recited in claim 15 in which said hydroxy-functional polytertiary amine resin is an acrylic copolymer.

17. An ultraviolet-curable coating composition as recited in claim 15 in which said hydroxy-functional polytertiary amine resin is a polyepoxide having a number average molecular weight of from 350 to 5000, the epoxide groups of said polyepoxide having been reacted with secondary amine.

18. An ultraviolet-curable coating composition as recited in claim 15 in which said hydroxy-functional polytertiary amine resin is a maleate or fumarate-functional polyester resin containing tertiary amine groups.

* * * * *